United States Patent
Sugiura (10) Patent No.: US 12,158,664 B2
(45) Date of Patent: Dec. 3, 2024

(54) ELECTRO-OPTICAL DEVICE AND ELECTRONIC APPARATUS

(71) Applicant: SEIKO EPSON CORPORATION, Tokyo (JP)

(72) Inventor: Yukihiro Sugiura, Chitose (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/412,603

(22) Filed: Jan. 15, 2024

(65) Prior Publication Data

US 2024/0241409 A1   Jul. 18, 2024

(30) Foreign Application Priority Data

Jan. 18, 2023 (JP) .................................. 2023-005672

(51) Int. Cl.
G02F 1/1337 (2006.01)

(52) U.S. Cl.
CPC .. *G02F 1/133742* (2021.01); *G02F 1/133776* (2021.01)

(58) Field of Classification Search
CPC ..................... G02F 1/133742; G02F 1/133776
USPC ......................................... 349/123–136, 138
See application file for complete search history.

(56) References Cited

U.S. PATENT DOCUMENTS

| | | | |
|---|---|---|---|
| 2005/0088598 A1* | 4/2005 | Matsumori | G02F 1/133753 349/139 |
| 2012/0268702 A1* | 10/2012 | Imanishi | G02F 1/13394 349/124 |

FOREIGN PATENT DOCUMENTS

JP   2016095443   5/2016

* cited by examiner

*Primary Examiner* — Charles S Chang
(74) *Attorney, Agent, or Firm* — JCIPRNET (57) ABSTRACT

An electro-optical device includes a first substrate, a second substrate facing the first substrate, and an electro-optical layer disposed between the first substrate and the second substrate and having an optical characteristic changeable in accordance with an electrical field. The first substrate includes a substrate, an inorganic insulating layer, a first pixel electrode and a second pixel electrode spaced apart from each other, and an alignment layer. The inorganic insulating layer, the first pixel electrode, the second pixel electrode, and the alignment layer are arranged in this order from the substrate toward the electro-optical layer. The cover layer includes a first portion filling an area of the inorganic insulating layer between the first pixel electrode and the second pixel electrode. The alignment film includes a second portion that is in contact with the first portion and of which a surface opposite to the first portion is a planar surface.

9 Claims, 9 Drawing Sheets

ELECTRO-OPTICAL DEVICE AND ELECTRONIC APPARATUS

The present application is based on, and claims priority from JP Application Serial Number 2023-005672, filed Jan. 18, 2023, the disclosure of which is hereby incorporated by reference herein in its entirety.

BACKGROUND

1. Technical Field

The present disclosure relates to an electro-optical device and an electronic apparatus.

2. Related Art

As electronic apparatuses such as projectors, for example, electro-optical devices such as liquid crystal display devices of which optical characteristics can be changed for each pixel are used. As an example of such an electro-optical device, a liquid crystal device described in JP-A-2016-95443 is known.

The liquid crystal device described in JP-A-2016-95443 includes an element substrate, a counter substrate, and a liquid crystal layer disposed between these substrates and containing liquid crystal molecules. The element substrate includes a pixel electrode provided for each pixel, and an alignment film covering the pixel electrode. The alignment film is, for example, an inorganic alignment film formed by obliquely depositing an inorganic material, and imparts a pretilt to the liquid crystal molecules contained in the liquid crystal layer.

Further, the liquid crystal device is a vertical alignment mode liquid crystal device. In the vertical alignment mode liquid crystal device, when a pixel size is small, poor alignment of liquid crystal molecules easily occurs due to an influence of a transverse electrical field between adjacent pixel electrodes. In the liquid crystal device described in JP-A-2016-95443, the disposition of the pixel electrodes is devised to curb poor alignment of liquid crystal molecules due to the transverse electrical field.

When the alignment film is formed at the pixel electrode through oblique deposition, this will be a shadow of a step of the pixel electrode, and an unevenly deposited or non-deposited area will occur between adjacent pixel electrodes. When there is an unevenly deposited or non-deposited area between the pixel electrodes, poor alignment of liquid crystal molecules may occur between the pixel electrodes. Therefore, even when the disposition of pixel electrodes is devised as described in JP-A-2016-95443, poor alignment between the pixel electrodes may affect the alignment of liquid crystal molecules within the pixel, causing poor alignment of liquid crystal molecules within the pixels. In particular, when the electro-optical device absorbs moisture during manufacturing or the like, an alignment regulation force of the alignment film decreases, and when poor alignment occurs due to the transverse electrical field, the poor alignment continues not only during application of an electrical field but also after application of the electrical field. Display quality may deteriorate due to this poor alignment.

SUMMARY

An electro-optical device according to one aspect of the present disclosure includes: a first substrate, a second substrate facing the first substrate, and an electro-optical layer disposed between the first substrate and the second substrate and having an optical characteristic changeable in accordance with an electrical field, in which the first substrate includes a substrate, an inorganic insulating layer, a first pixel electrode and a second pixel electrode spaced apart from each other, and an alignment layer, the inorganic insulating layer, the first pixel electrode, the second pixel electrode, and the alignment layer are arranged in order from the substrate toward the electro-optical layer, the alignment layer includes a cover layer and an alignment film provided between the cover layer and the electro-optical layer, the cover layer includes a first portion filling an area of the inorganic insulating layer between the first pixel electrode and the second pixel electrode in a plan view, and the alignment film includes a second portion that is in contact with the first portion and of which a surface opposite to the first portion is a planar surface.

An electro-optical device according to one aspect of the present disclosure includes: a first substrate, a second substrate facing the first substrate, and an electro-optical layer disposed between the first substrate and the second substrate and having an optical characteristic changeable in accordance with an electrical field, in which the first substrate includes a substrate, an inorganic insulating layer, a plurality of pixel electrodes disposed in a matrix form in a first direction and a second direction intersecting with each other, and an alignment layer, the inorganic insulating layer, the plurality of pixel electrodes, and the alignment layer are arranged in order from the substrate toward the electro-optical layer, the alignment layer includes a first cover film, a second cover film, and an alignment film in order, the first cover film includes a first structure inclined with respect to a normal line to a substrate surface of the first substrate, the second cover film includes a second structure inclined with respect to the normal line, the alignment film includes a third structure inclined with respect to the normal line, one of the first structure and the second structure has an azimuth of 0°, the other of the first structure and the second structure has an azimuth of 90°, and the third structure has an azimuth of 45°.

DESCRIPTION OF EMBODIMENTS

Hereinafter, preferred embodiments of the present disclosure will be described with reference to the accompanying drawings. In the drawings, the dimensions and scales of the components may differ from the actual dimensions or scales, and some portions are schematically illustrated to facilitate understanding. Further, the scope of the present disclosure is not limited to these embodiments unless there is a description that particularly limits the present disclosure in the following description.

1. Electro-optical Device

1A. Basic Configuration

Figure 1:
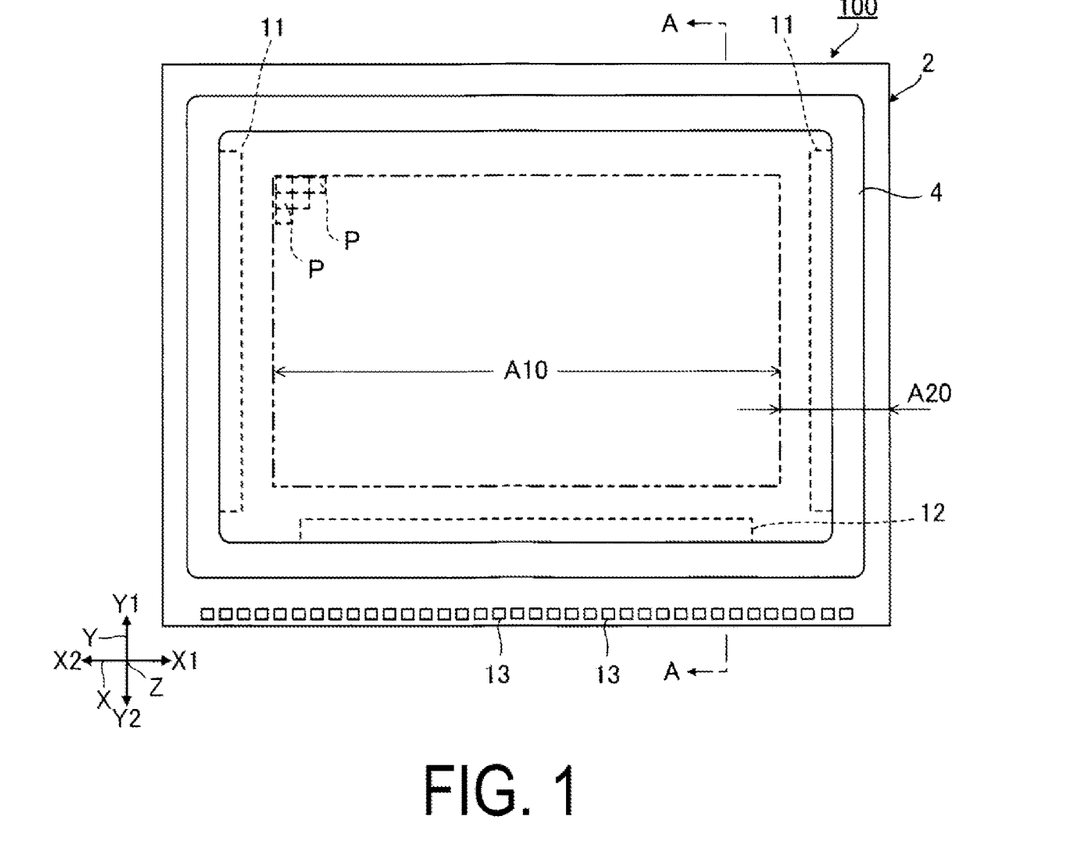
FIG. 1 is a plan view of an electro-optical device according to an embodiment.
Figure 2:
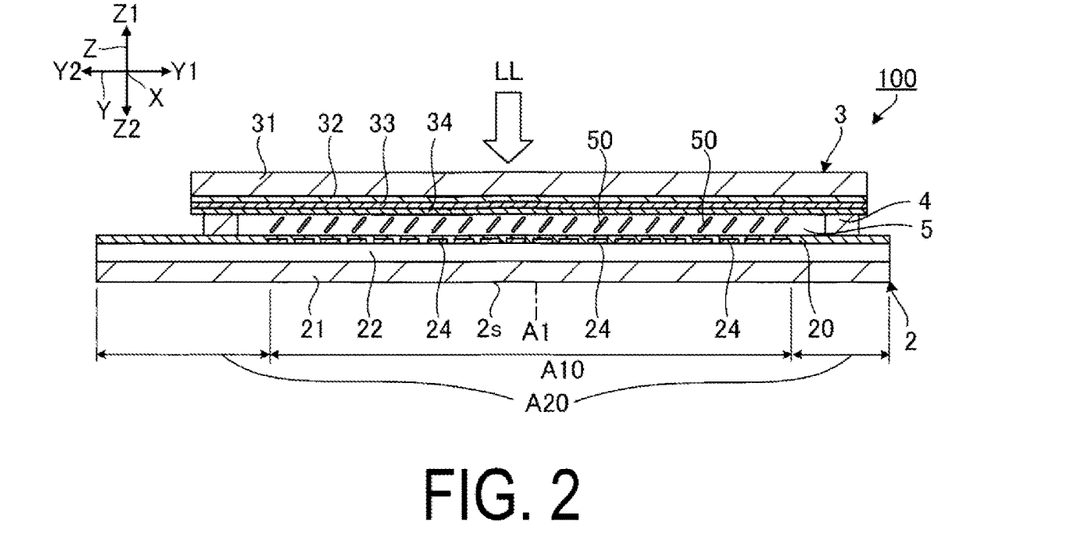
FIG. 2 is a cross-sectional view taken along line A-A of the electro-optical device illustrated in FIG. 1.

FIG. 1 is a plan view of an electro-optical device 100 according to an embodiment. FIG. 2 is a cross-sectional view taken along line A-A of the electro-optical device 100 illustrated in FIG. 1. In FIG. 1, a second substrate 3 is not illustrated. Further, hereinafter, for convenience of description, an X-axis, a Y-axis, and a Z-axis orthogonal to each other will be used as appropriate. Further, one direction along the X-axis is referred to as an X1 direction, and a direction opposite to the X1 direction is referred to as an X2 direction. Similarly, one direction along the Y-axis is referred to as a Y1 direction, and a direction opposite to the Y1 direction is referred to as a Y2 direction. One direction along the Z axis is referred to as a Z1 direction, and a direction opposite to the Z1 direction is referred to as a Z2 direction. Further, the Y1 direction is an example of a "first direction". The X1 direction is an example of a "second direction". Further, a direction along the X-Y plane is defined as a "horizontal direction", and the Z1 direction or Z2 direction is defined as a "vertical direction".

Further, in the present specification, "element β on element α" means that element β is located above element α. Therefore, "element β on element α" includes not only a case in which element β is in direct contact with element α, but also a case in which element α and element β are spaced apart. Further, an "electrical coupling" between element α and element β includes a configuration in which element α and element β are directly bonded to each other and conducting therebetween, as well as a configuration in which element α and element β are indirectly conducting therebetween via another conductor.

The electro-optical device 100 illustrated in FIGS. 1 and 2 is a transmissive electro-optical device of an active matrix drive type. As illustrated in FIG. 2, the electro-optical device 100 includes a first substrate 2, the second substrate 3, a frame-shaped sealing member 4, and a liquid crystal layer 5. As illustrated in FIG. 2, the first substrate 2, the liquid crystal layer 5, and the second substrate 3 are disposed in this order in the Z1 direction. Viewing from the Z1 direction or Z2 direction, which is a direction in which these overlap, is referred to as "plan view". Further, although a shape of the electro-optical device 100 illustrated in FIG. 1 is a rectangular shape in plan view, the shape may have a polygonal shape or a circular shape other than the rectangular shape.

The first substrate 2 illustrated in FIG. 2 includes a substrate 21 having light transmissivity, an inorganic insulating layer 22 having light transmissivity, a plurality of pixel electrodes 24 having light transmissivity, and a first alignment layer 20 having light transmissivity. The first alignment layer 20 is an example of an "alignment layer". The inorganic insulating layer 22, the plurality of pixel electrodes 24, and the first alignment layer 20 are arranged in this order toward the liquid crystal layer 5 from the substrate 21. The "light transmissivity" means transmissivity with respect to visible light, and may mean a transmittance of visible light of 50% or more. Further, in FIG. 2, a normal line A1 to a substrate surface 2s, which is a lower surface of the first substrate 2, is illustrated.

The substrate 21 is a plate having light transmissivity and an insulation property, and is constituted by, for example, a glass substrate or a quartz substrate. The inorganic insulating layer 22 is a layered body of a plurality of inorganic insulating films having light transmissivity. Further, the inorganic insulating layer 22 is provided with switching elements, various wirings, and the like. Each pixel electrode 24 is an electrode for applying an electrical field to the liquid crystal layer 5. Each pixel electrode 24 contains a transparent conductive material such as indium tin oxide (ITO), indium zinc oxide (IZO), and fluorine-doped tin oxide (FTO). Although not illustrated, the first substrate 2 includes a plurality of dummy pixel electrodes surrounding the plurality of pixel electrodes 24 in plan view. Further, the first alignment layer 20 has light transmissivity and an insulation property. The first alignment layer 20 aligns the liquid crystal molecules 50 included in the liquid crystal layer 5. The first alignment layer 20 covers the plurality of pixel electrodes 24. The first alignment layer 20 includes, for example, an inorganic material such as a silicon oxide, and is formed through oblique deposition.

The second substrate 3 faces the first substrate 2. The second substrate 3 includes a substrate 31 having light transmissivity, an inorganic insulating layer 32 having light transmissivity, a common electrode 33 having light transmissivity, and a second alignment layer 34 having light transmissivity. The inorganic insulating layer 32, the common electrode 33, and the second alignment layer 34 are arranged in this order toward the liquid crystal layer 5 from the substrate 31. Further, although not illustrated, the second substrate 3 includes an edge having a light-blocking property that surrounds the plurality of pixel electrodes 24 in plan view. The "light-blocking property" means light-blocking property against visible light, and may mean a transmittance of visible light of less than 50%, and may mean a transmittance of visible light of 10% or less.

The substrate 31 is a plate having light transmissivity and an insulation property, and is constituted by, for example, a glass substrate or a quartz substrate. The inorganic insulating layer 32 has light transmissivity and an insulation property, and is made of an inorganic material containing silicon, such as silicon oxide. The common electrode 33 is a facing electrode disposed with the liquid crystal layer 5 therebetween with respect to the plurality of pixel electrodes 24, and is an electrode for applying an electrical field to the liquid crystal layer 5 together with the plurality of pixel electrodes 24. The common electrode 33 has light transmissivity and conductivity. The common electrode 33 contains, for example, a transparent conductive material such as ITO, IZO, and FTO. The second alignment layer 34 has light transmissivity and an insulation property. The second alignment layer 34 aligns liquid crystal molecules included in the liquid crystal layer 5. A material of the second alignment layer 34 is silicon oxide or the like. The second alignment layer 34 includes, for example, an inorganic material such as a silicon oxide, and is formed through oblique deposition.

The sealing member 4 is disposed between the first substrate 2 and the second substrate 3. The sealing member 4 is formed by using, for example, an adhesive containing various curable resins such as an epoxy resin. The sealing member 4 may include a gap material made of an inorganic material such as glass.

The liquid crystal layer 5 is disposed within an area surrounded by the first substrate 2, the second substrate 3, and the sealing member 4. The liquid crystal layer 5 is an electro-optical layer of which the optical characteristics change in accordance with the electrical field. The liquid crystal layer 5 includes, for example, nematic liquid crystal with negative dielectric anisotropy. The alignment of the liquid crystal molecules 50 included in the liquid crystal layer 5 changes in accordance with a voltage applied to the liquid crystal layer 5.

As illustrated in FIG. 1, a plurality of scanning line drive circuits 11, a signal line drive circuit 12, and a plurality of external terminals 13 are disposed on the first substrate 2. Some of the plurality of external terminals 13 are coupled to a wiring line (not illustrated) drawn from the scanning line drive circuit 11 or the signal line drive circuit 12. Further, the plurality of external terminals 13 include a terminal to which a constant potential Vcom is applied. The terminal is electrically coupled to the common electrode 33 of the second substrate 3 via a wiring line and a conductive material (not illustrated).

The electro-optical device 100 includes a display area A10 in which an image is displayed, and a peripheral area A20 located outside the display area A10 in plan view. A plurality of pixels P disposed in a matrix form are provided in the display area A10. The plurality of pixel electrodes 24 are disposed in a one-to-one relationship with respect to the plurality of pixels P. The above-described common electrode 33 is provided in common for the plurality of pixels P. Further, the peripheral area A20 surrounds the display area A10 in plan view. The scanning line drive circuit 11 and the signal line drive circuit 12 are disposed in the peripheral area A20.

In the present embodiment, the electro-optical device 100 is of a transmissive type. In one example, as illustrated in FIG. 2, after being incident on the second substrate 3, light LL is modulated while being emitted from the first substrate 2, whereby an image is displayed. The image may be displayed by the light incident on the first substrate 2 being modulated while the light is being emitted from the second substrate 3.

Such an electro-optical device 100 is of a so-called normally black type in which the transmittance decreases and a black display occurs when no voltage is applied, and the transmittance increases when a voltage is applied. Further, a driving method of the electro-optical device 100 is of a so-called vertical alignment (VA) type. The electro-optical device 100 aligns the liquid crystal molecules 50 having negative dielectric anisotropy in a substantially vertical direction when applying a voltage by using the first alignment layer 20 and the second alignment layer 34, and aligns the liquid crystal molecules 50 in a horizontal direction when not applying the voltage.

Further, the electro-optical device 100 is applied to, for example, a display device that performs color display, of a personal computer, a smartphone, or the like, which will be described below. When the electro-optical device 100 is applied to the display device, a color filter is used as appropriate for the electro-optical device 100. Further, the electro-optical device 100 is applied to, for example, a projection type projector, which will be described below. In this case, the electro-optical device 100 serves as a light valve. In this case, the color filter is omitted from the electro-optical device 100.

1B. Electrical Configuration of First Substrate 2

Figure 3:
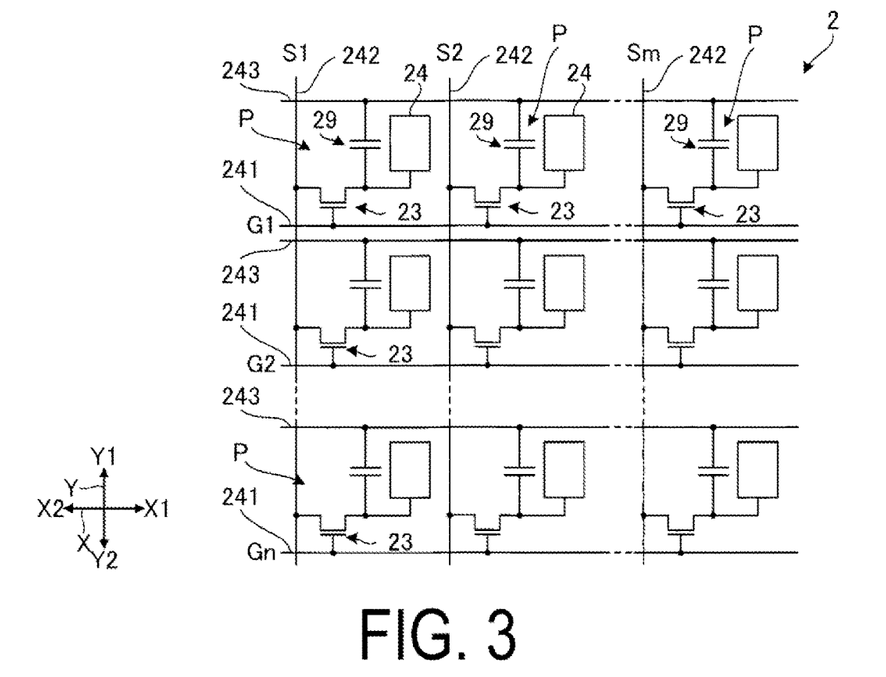
FIG. 3 is an equivalent circuit diagram illustrating an electrical configuration of a first substrate in FIG. 1.

FIG. 3 is an equivalent circuit diagram illustrating an electrical configuration of the first substrate 2 of FIG. 1. As illustrated in FIG. 3, the first substrate 2 includes a plurality of transistors 23, n scanning lines 241, m signal lines 242, and n constant potential lines 243. n and m are integers equal to or greater than 2. The transistor 23 is disposed corresponding to each of intersections between the n scanning lines 241 and the m signal lines 242. Each transistor 23 is, for example, a thin film transistor (TFT) that serves as a switching element. Each transistor 23 includes a gate, a source, and a drain.

Each of the n scanning lines 241 extends in the X1 direction, and the n scanning lines 241 are arranged at equal intervals in the Y1 direction. The n scanning lines 241 are electrically coupled to the gates of the plurality of corresponding transistors 23. The n scanning lines 241 are electrically coupled to the scanning line drive circuit 11 illustrated in FIG. 1. Scanning signals G1, G2, . . . , and Gn are supplied line-sequentially from the scanning line drive circuit 11 to the 1 to n scanning lines 241.

Each of the m signal lines 242 illustrated in FIG. 3 extends in the Y1 direction, and the m signal lines 242 are arranged at equal intervals in the X1 direction. The m signal lines 242 are electrically coupled to the sources of the plurality of corresponding transistors 23. The m signal lines 242 are electrically coupled to the signal line drive circuit 12 illustrated in FIG. 1. Image signals S1, S2, . . . , and Sm are supplied in parallel from the signal line drive circuit 12 to the 1 to m signal lines 242.

The n scanning lines 241 and the m signal lines 242 illustrated in FIG. 3 are electrically insulated from each other and disposed in a grid pattern in plan view. An area surrounded by two adjacent scanning lines 241 and two adjacent signal lines 242 corresponds to a pixel P. The transistor 23, the pixel electrode 24, and a storage capacitor 29 are provided for each pixel P. The pixel electrodes 24 are provided in a one-to-one relationship with respect to the transistors 23. Each pixel electrode 24 is electrically coupled to the drain of the corresponding transistor 23.

Each of the n constant potential lines 243 extends in the X1 direction, and the n constant potential lines 243 are arranged at equal intervals in the Y1 direction. Further, the n constant potential lines 243 are electrically insulated from the n scanning lines 241 and the m signal lines 242, and are disposed at intervals with respect to these lines. The constant potential Vcom is applied to each constant potential line 243. Each of the n constant potential lines 243 is electrically coupled to one of two electrodes of the corresponding storage capacitor 29. Each storage capacitor 29 is a holding capacitor for holding a potential of the pixel electrode 24. The storage capacitor 29 is provided in a one-to-one relationship with respect to the transistor 23. Further, the other of the two electrodes of each storage capacitor 29 is electrically coupled to the corresponding pixel electrode 24. Therefore, the constant potential Vcom is applied to the one electrode of the storage capacitor 29, and the other electrode is electrically coupled to the drain of the transistor 23.

When the scanning signals G1, G2, . . . , and Gn are sequentially activated and the n scanning lines 241 are sequentially selected, the transistor 23 coupled to the selected scanning line 241 is turned on. In the on state, currents corresponding to the image signals S1, S2, . . . , and Sm with magnitude corresponding to a gradation to be displayed are supplied to the pixel electrodes 24 corresponding to the selected scanning line 241 via the m signal lines 242. Accordingly, a voltage corresponding to the gradation to be displayed is applied to a liquid crystal capacitor formed between the pixel electrode 24 and the common electrode 33 in FIG. 2, and the alignment of the liquid crystal molecules 50 is changed according to the applied voltage. Such a change in the alignment of the liquid crystal molecules 50 changes the transmittance of the light LL.

1C. Display Area A10

Figure 4:
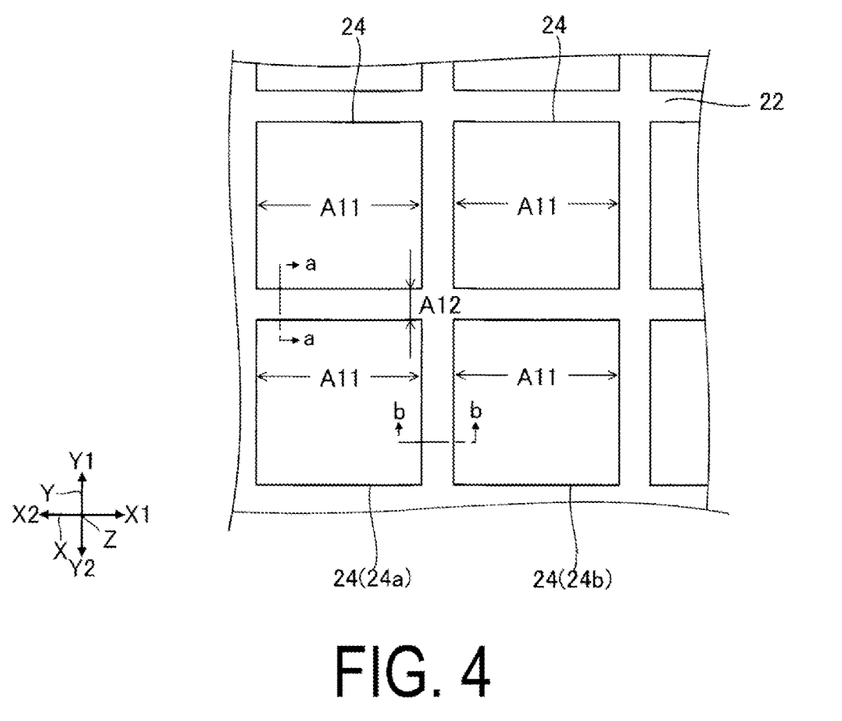
FIG. 4 is a plan view illustrating part of an inorganic insulating layer and a plurality of pixel electrodes illustrated in FIG. 2.

FIG. 4 is a plan view illustrating part of the inorganic insulating layer 22 and the plurality of pixel electrodes 24 illustrated in FIG. 2. As illustrated in FIG. 4, a planar shape of each pixel electrode 24 is a rectangular shape. The plurality of pixel electrodes 24 are spaced apart from each other and disposed in a matrix form in the X1 direction and the Y1 direction in plan view. For example, when any one pixel electrode 24 of the plurality of pixel electrodes 24 is set as a first pixel electrode 24a, any one pixel electrode 24 adjacent to the first pixel electrode 24a is set as a second pixel electrode 24b. In the example of FIG. 4, a lower left pixel electrode 24 in FIG. 4 is the first pixel electrode 24a, and the pixel electrode 24 on the right is the second pixel electrode 24b.

The inorganic insulating layer 22 includes a pixel area A11 in which each pixel electrode 24 is provided, and a non-pixel area A12 in which the plurality of pixel electrodes 24 are not provided. The pixel area A11 is an area that transmits light. Although not illustrated in the drawings, the non-pixel area A12 is provided with the transistor 23, various types of wiring lines, and the like. The non-pixel area A12 has a light-blocking property. Further, the non-pixel area A12 is an area located between the plurality of pixel electrodes 24 in plan view, and includes an area between the first pixel electrode 24a and the second pixel electrode 24b.

Figure 5:
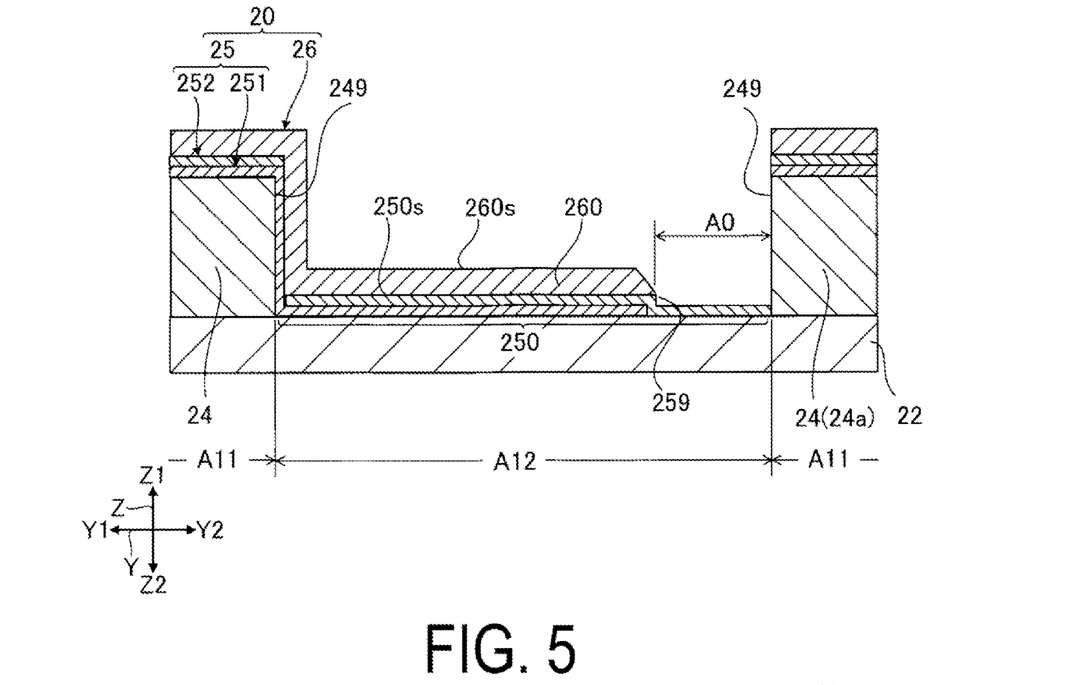
FIG. 5 is a diagram corresponding to a cross section taken along line a-a in FIG. 4.
Figure 6:
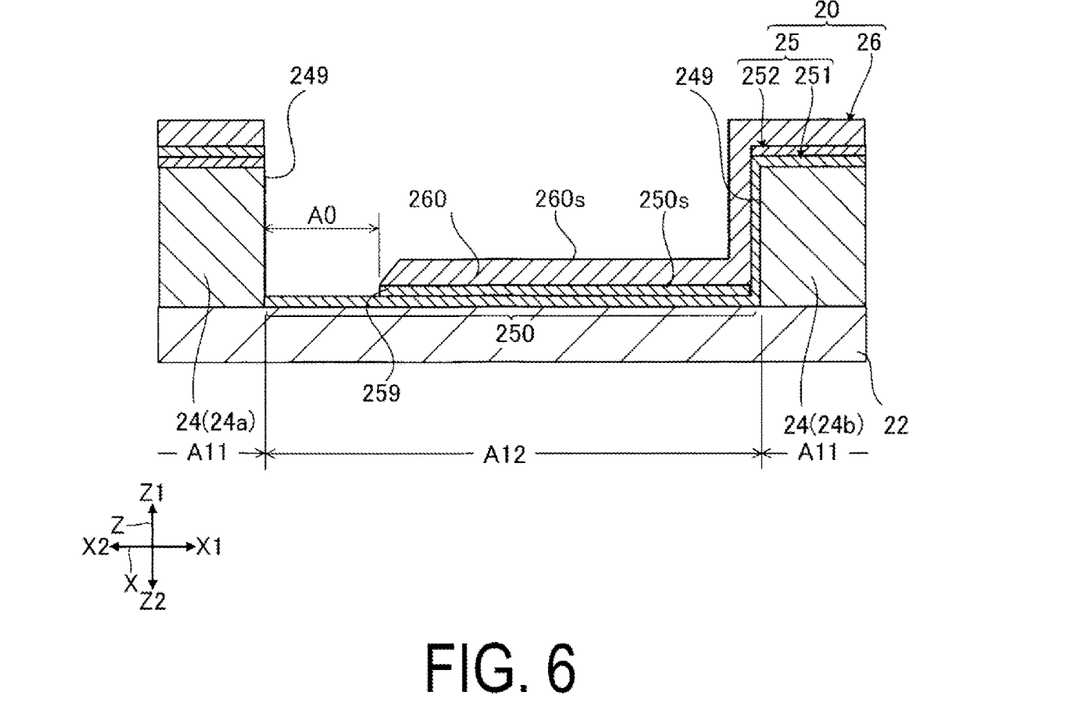
FIG. 6 is a diagram corresponding to a cross section taken along line b-b in FIG. 4.

FIG. 5 is a diagram corresponding to a cross section taken along line a-a in FIG. 4. FIG. 6 is a diagram corresponding to a cross section taken along line b-b in FIG. 4. The inorganic insulating layer 22 illustrated in FIGS. 5 and 6 includes a plurality of inorganic insulating films made of an inorganic material containing silicon, such as a silicon oxide and a silicon oxynitride. The inorganic insulating layer 22 does not have an alignment regulation force for aligning the liquid crystal molecules 50. Further, the plurality of pixel electrodes 24 are disposed on the inorganic insulating layer 22. Each pixel electrode 24 has a rectangular shape in plan view, and includes a step 249 along each side.

The first alignment layer 20 is disposed on each pixel electrode 24. As illustrated in FIG. 2, the first alignment layer 20 is disposed between the plurality of pixel electrodes 24 and the liquid crystal layer 5, and are in contact with the liquid crystal layer 5. The first alignment layer 20 controls an arrangement state of the liquid crystal molecules 50. As illustrated in FIGS. 5 and 6, the first alignment layer 20 is provided in the plurality of pixel areas A11 and non-pixel areas A12 described above.

The first alignment layer 20 includes a cover layer 25 and an alignment film 26. The cover layer 25 is in contact with the plurality of pixel electrodes 24. The alignment film 26 is disposed between the cover layer 25 and the liquid crystal layer 5, and is in contact with the cover layer 25 and the liquid crystal layer 5. The cover layer 25 and the alignment film 26 contain, for example, an inorganic material such as silicon oxide, and are formed through oblique deposition. Further, the cover layer 25 and the alignment film 26 are formed, for example, by deposition from mutually different deposition directions.

The cover layer 25 is a cover that covers the plurality of pixel electrodes 24 and the inorganic insulating layer 22. The cover layer 25 is a base layer of the alignment film 26 and is provided to eliminate an influence of the inorganic insulating layer 22 on the alignment film 26. When the cover layer 25 is provided, a negative influence on the growth of a third structure 26s included in the alignment film 26, which will be described below, is curbed. The cover layer 25 may have an alignment regulation force for aligning the liquid crystal molecules 50. The cover layer 25 includes a first portion 250 provided in the non-pixel area A12. The first portion 250 has a lattice shape in plan view and fills a space between the adjacent pixel electrodes 24, like the non-pixel area A12. When the first portion 250 is provided, contact between the inorganic insulating layer 22 and the liquid crystal molecules 50 is avoided. Therefore, it is possible to curb the occurrence of poor alignment of the liquid crystal molecules 50 due to the inorganic insulating layer 22 having no alignment regulation force coming into contact with the liquid crystal molecules 50.

The cover layer 25 includes a first cover film 251 and a second cover film 252. The first cover film 251 is in contact with the plurality of pixel electrodes 24. The second cover film 252 is mainly disposed between the first cover film 251 and the alignment film 26. Further, each of the first cover film 251 and the second cover film 252 is provided in the plurality of pixel areas A11 and the non-pixel area A12. Each of the first cover film 251 and the second cover film 252 may include an island-like structure that becomes a core of the third structure 26s of the alignment film 26, which will be described below. The island-like structure is formed in the initial stage of thin film formation. Therefore, each of the first cover film 251 and the second cover film 252 may include a partially thin portion.

The first cover film 251 and the second cover film 252 are formed through oblique deposition. Therefore, each of the first cover film 251 and the second cover film 252 is provided in part of the non-pixel area A12 due to a shadow of the step 249 of each pixel electrode 24. Further, as will be described in detail below, the first cover film 251 and the second cover film 252 are formed by deposition from mutually different deposition directions. Therefore, the first cover film 251 and the second cover film 252 are different from each other in areas in which the first cover film 251 and the second cover film 252 are not provided in the non-pixel area A12. Part of the second cover film 252 is provided in an area in which the first cover film 251 is not provided in the non-pixel area A12. Therefore, the second cover film 252 includes a portion in direct contact with the inorganic insulating layer 22, and an upper surface 250s of the first portion 250 includes a step 259.

Of the first alignment layers 20, the alignment film 26 is closest to the liquid crystal layer 5. The alignment film 26 is in direct contact with the liquid crystal molecules 50 and controls the alignment of the liquid crystal molecules 50. The alignment film 26 is provided in the plurality of pixel areas A11 and non-pixel areas A12. The alignment film 26 includes a second portion 260 provided in the non-pixel area A12. The second portion 260 is in contact with the first portion 250. The second portion 260 does not cover the entire area of the first portion 250. Thus, an area A0 in which the alignment film 26 is not provided is present in the upper surface 250s of the first portion 250. A ratio of the area A0 to the non-pixel area A12 is 50% or less.

Further, an upper surface 260s of the second portion 260, that is, a surface of the second portion 260 opposite to the first portion 250, is a planar surface. A planar surface refers to a surface without a step, and may refer to a surface having a surface roughness Ra of less than 300 Å. However, the upper surface 260s has surface irregularities for exerting an alignment regulation force.

The alignment film 26 is formed through oblique deposition. Therefore, there is the area A0 in which in the alignment film 26 is not provided in the non-pixel area A12 due to the shadow of the step 249 of each pixel electrode 24. The area A0 is present in the Y2 direction relative to a line segment in the X1 direction of the two pixel electrodes 24 arranged in the Y1 direction, and the X2 direction relative to a line segment in the Y1 direction of the two pixel electrodes 24 arranged in the X1 direction. Further, as will be described in detail below, the alignment film 26 is formed through deposition from a different deposition direction from the deposition directions of the first cover film 251 and the second cover film 252.

As described above, in the electro-optical device 1, the first alignment layer 20 as an "alignment layer" is provided on the plurality of pixel electrodes 24. The first alignment layer 20 includes the cover layer 25 and the alignment film 26. The cover layer 25 includes the first portion 250 with which the non-pixel area A12 is filled.

According to such an electro-optical device 1, since the cover layer 25 with which the non-pixel area A12 is filled is included, it is possible to cover the inorganic insulating layer 22 on which the alignment regulation force does not act, with the cover layer 25. Since the inorganic insulating layer 22 on which the alignment regulation force does not act is covered with the cover layer 25, it is possible to curb poor alignment in the non-pixel area A12 between the plurality of pixel electrodes 24. Therefore, it is possible to curb the occurrence of poor alignment in the pixel area A11 due to the poor alignment. Further, when the electro-optical device 1 absorbs moisture during manufacturing or the like, the alignment regulation force may decrease, and the poor alignment may continue not only during application of an electrical field but also after application of the electrical field. However, in the present embodiment, since the inorganic insulating layer 22 on which the alignment regulation force does not act is covered with the cover layer 25, poor alignment in the non-pixel area A12 is curbed, and thus continuation of poor alignment due to moisture absorption is curbed. Therefore, it is possible to curb deterioration in display quality.

Further, as described above, the alignment film 26 includes the second portion 260 disposed between the first portion 250 and the liquid crystal layer 5, and the upper surface 260s of the second portion 260 is a continuous planar surface. Therefore, the upper surface 260s of the alignment film 26 does not have irregularities or deficiency due to uneven deposition. Therefore, it is possible to curb poor alignment due to uneven deposition. Therefore, it is possible to curb deterioration in display quality. Further, the second portion 260 is disposed on a portion of the first portion 250 in which the first cover film 251 and the second cover film 252 are layered. Therefore, the second portion 260 is disposed on a planar portion of the upper surface 250s of the first portion 250.

Further, an average thickness of the alignment film 26 is larger than an average thickness of the cover layer 25. Therefore, the liquid crystal molecules 50 is less likely to be affected by a surface shape of the cover layer 25, which serves as a base of the alignment film 26, as compared to a case in which the average thickness of the alignment film 26 is equal to or smaller than the average thickness of the cover layer 25. Therefore, in the display area A10, alignment directions of the plurality of liquid crystal molecules 50 are easily aligned.

The alignment of the liquid crystal molecules 50 is regulated by a shape of an outermost surface of the first alignment layer 20. Since the cover layer 25 and the alignment film 26 have different deposition directions, upper surfaces have different surface shapes. Therefore, directions in which the liquid crystal molecules 50 are aligned are different between the cover layer 25 and the alignment film 26. Therefore, when the average thickness of the alignment film 26 equal to or smaller than the average thickness of the cover layer 25, the liquid crystal molecules 50 is less likely to be affected by the surface shape of the cover layer 25. On the other hand, since the average thickness of the alignment film 26 is larger than the average thickness of the cover layer 25, the liquid crystal molecules 50 is less likely to be affected by the surface shape of the cover layer 25.

The average thickness of the alignment film 26 may be, for example, 300 Å or more and less than 500 Å, and may be 360 Å or more and less than 400 Å. When the average thickness is within the above range, the liquid crystal molecules 50 is less likely to be affected by the surface shape of the cover layer 25 and the formation of the alignment film 26 does not take excessive time, as compared to a case in which the average thickness is outside the above range.

The average thickness of the cover layer 25 may be, for example, 280 Å or more and less than 400 Å, and may be 320 Å or more and less than 360 Å. When the average thickness is equal to or greater than the above lower limit, it is easy to uniformly fill the non-pixel area A12, and thus it is easy to particularly effectively curb the influence of the inorganic insulating layer 22 having no alignment regulation force. Further, when the average thickness is smaller than the above upper limit, film formation does not take excessive time. Further, an average thickness of each of the first cover film 251 and the second cover film 252 may be 140 Å or more and less than 200 Å, and may be 160 Å or more and less than 180 Å. When each average thickness is within the above range, it is easier to uniformly fill the non-pixel area A12 and it is possible to improve the planarity of the upper surface 250s, as compared to a case in which each average thickness is outside the range.

Further, each of materials of the first cover film 251 and the second cover film 252 is not particularly limited, and may be an inorganic material, with examples including SiN, AlO, SiOx, $TiO_2$, MgO, and $Al_2O_3$. Note that x in SiOx is equal to or greater than 2. A material of the alignment film 26 may be an inorganic material, with examples including $SiO_2$. When the inorganic material is used, the first alignment layer 20 can be formed through oblique deposition. Thus, even when a pixel pitch of the plurality of pixel electrodes 24 is small, it is possible to curb generation of an area in which the first alignment layer 20 is not provided.

The materials of the first cover film 251, the second cover film 252, and the alignment film 26 may be $SiO_2$. With $SiO_2$, it is easy to form the first alignment layer 20 with a desired thickness while ensuring the light transmissivity of the first alignment layer 20.

1-D. First Alignment Layer 20 and Second Alignment Layer 34

Figure 7:
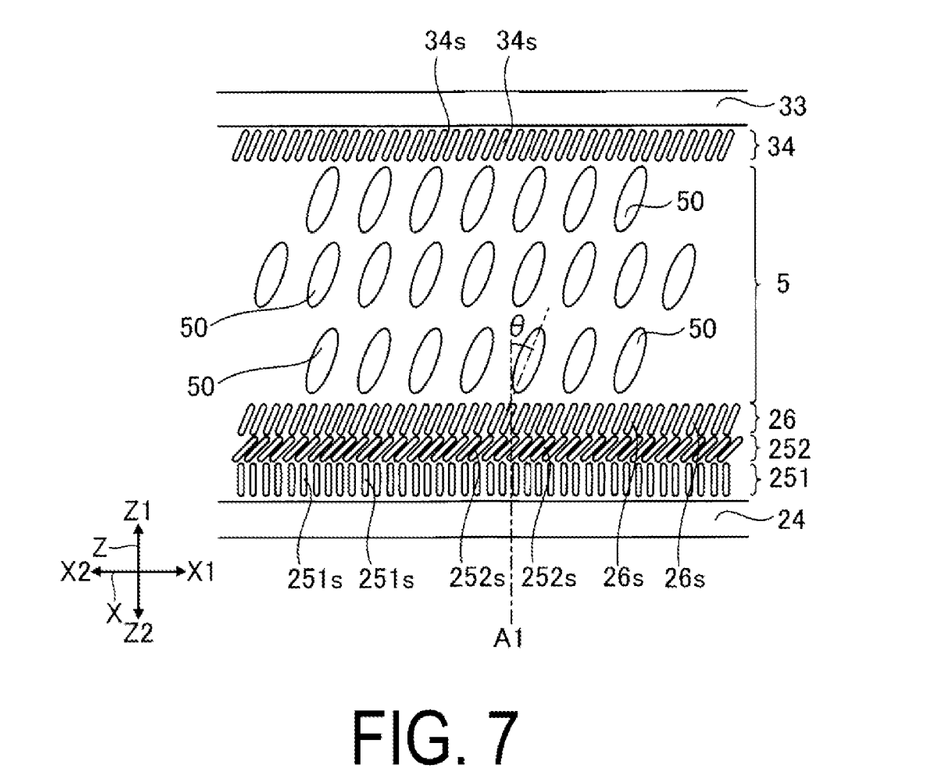
FIG. 7 is a diagram illustrating a first alignment layer and a second alignment layer illustrated in FIG. 2.

FIG. 7 is a diagram illustrating the first alignment layer 20 and the second alignment layer 34 illustrated in FIG. 2. The second alignment layer 34 illustrated in FIG. 7 includes, for example, an inorganic material and is formed through oblique deposition. The second alignment layer 34 includes a plurality of structures 34s. The structure 34s is a columnar crystal body of the inorganic material. The structure 34s grows in a columnar shape along a line segment parallel to the deposition direction of the oblique deposition.

The first alignment layer 20 includes a plurality of first structures 251s, a plurality of second structures 252s, and a plurality of third structures 26s. In one example, the first cover film 251 includes the plurality of first structures 251s. The second cover film 252 includes the plurality of second structures 252s. The alignment film 26 includes the plurality of third structures 26s. Each of the first cover film 251, the second cover film 252, and the alignment film 26 includes, for example, an inorganic material and is formed through oblique deposition, as described above. Each of the plurality of first structures 251s, the plurality of second structures 252s, and the plurality of third structures 26s is a columnar crystal body of the inorganic material. Each of the plurality of first structures 251s, the plurality of second structures 252s, and the plurality of third structures 26s grows in a columnar shape along a line segment parallel to the deposition direction of the oblique deposition. However, the plurality of first structures 251s and the plurality of second structures 252s may include the above-described island-like structure. Each of the first cover film 251 and the second cover film 252 may have such thickness as to include an island-like structure. Further, each third structure 26s has a columnar shape. Therefore, the liquid crystal molecules 50 are aligned.

The alignment of the liquid crystal molecules 50 is controlled by alignment regulation force due to surface shapes of the second alignment layer 34 and the alignment film 26. The liquid crystal molecules 50 have a rod-like structure. The liquid crystal molecules 50 are substantially vertically aligned in a state in which long axes of the liquid crystal molecules 50 are slightly inclined at a pretilt angle θ with respect to the normal line A1 in a state in which no voltage is applied. The pretilt angle θ is an angle formed between the long axis of the liquid crystal molecule 50 and the normal line A1. The pretilt angle θ depends on each inclination direction of the plurality of structures 34s and the plurality of third structures 26s. The angles of the plurality of structures 34s and the plurality of third structures 26s with respect to the normal line A1 are set so that the pretilt angle θ is at a desired angle.

1-E. First Alignment Layer 20

Figure 8:
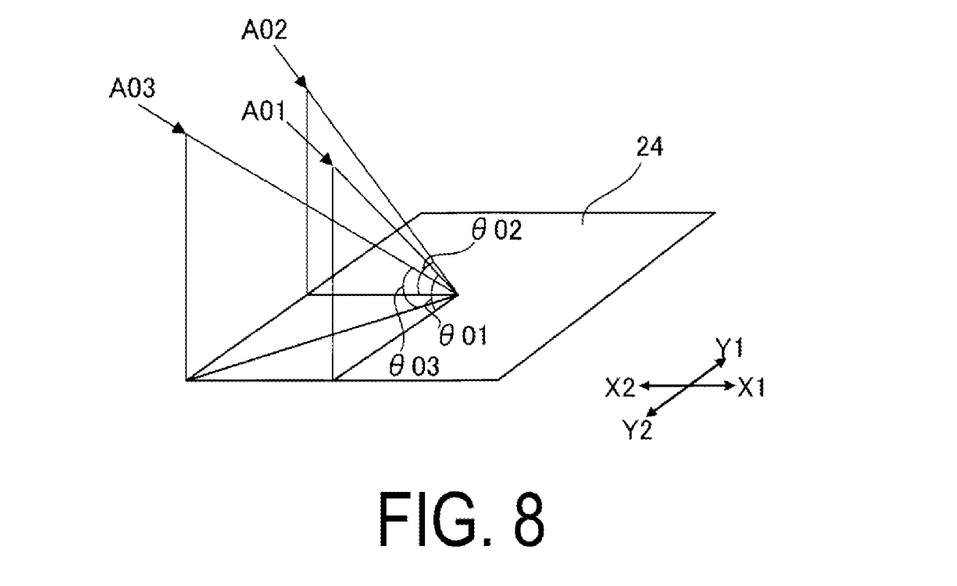
FIG. 8 is a diagram illustrating a deposition direction of the first alignment layer illustrated in FIG. 7.

FIG. 8 is a diagram illustrating a deposition direction of the first alignment layer 20 illustrated in FIG. 7. The first cover film 251, the second cover film 252, and the alignment film 26 are formed through the oblique deposition from mutually different deposition directions. As illustrated in FIG. 8, an angle θ01 between a deposition direction A01 for forming the first structure 251s and a surface of the pixel electrode 24 is, for example, 40° or more and 50° or less. An angle θ02 between a deposition direction A02 for forming the second structure 252s and the surface of the pixel electrode 24 is, for example, 40° or more and 50° or less. An angle θ03 between a deposition direction A03 for forming the third structure 26s and the surface of the pixel electrode 24 is, for example, 40° or more and 50° or less. Therefore, the angles θ01, θ02, and θ03 are equal to each other. The surface of the pixel electrode 24 is parallel to the substrate surface 2s of the first substrate 2 illustrated in FIG. 2.

Figure 9:
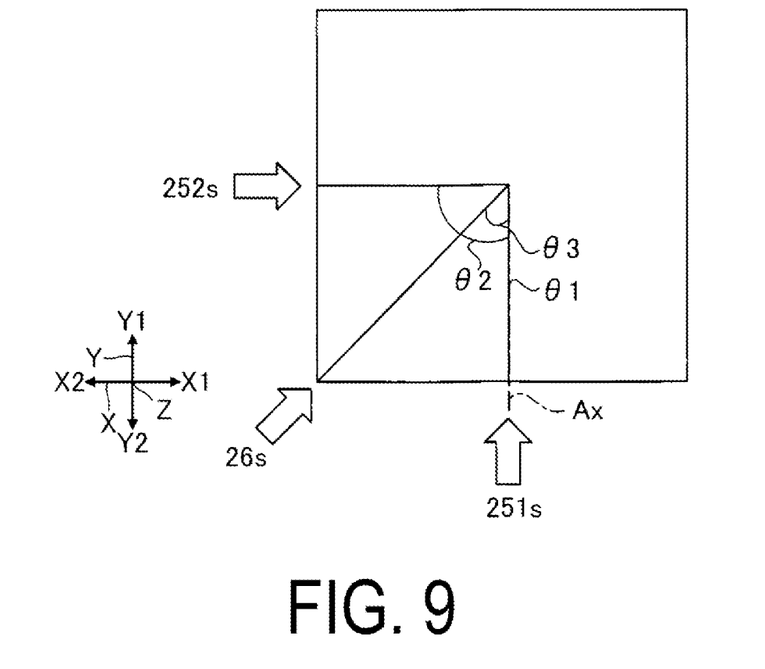
FIG. 9 is a diagram illustrating an azimuth of each of a first structure, a second structure, and a third structure in FIG. 7.

FIG. 9 is a diagram illustrating the azimuths of the first structure 251s, the second structure 252s, and the third structure 26s in FIG. 7. As described above, the first cover film 251, the second cover film 252, and the alignment film 26 are formed through oblique deposition from different deposition directions. Therefore, as illustrated in FIG. 9, the first structure 251s, the second structure 252s, and the third structure 26s have different azimuths from each other. The azimuth refers to an angle of each structure in a clockwise direction with respect to a reference line Ax in the Y1 direction in plan view. Hereinafter, counterclockwise angles are represented by negative values.

Since the azimuths of the first structure 251s and the second structure 252s are different from each other, the first cover film 251 and the second cover film 252 are different from each other in areas in which the first cover film 251 and the second cover film 252 are not provided in the non-pixel area A12. When the first cover film 251 is formed through oblique deposition, this becomes the shadow of the step 249, and an area in which the first cover film 251 is not provided is formed in the non-pixel area A12. However, it is possible to fill the area in which the first cover film 251 is not provided, with the second cover film 252, by forming the second cover film 252 through oblique deposition from a direction different from that of the first cover film 251. Therefore, since it is possible to avoid exposure of the inorganic insulating layer 22, contact between the inorganic insulating layer 22 and the liquid crystal molecules 50 can be avoided. Therefore, it is possible to curb the occurrence of poor alignment of the liquid crystal molecules 50 due to the inorganic insulating layer 22 having no alignment regulation force coming into contact with the liquid crystal molecules 50.

In the present embodiment, a first azimuth θ1 of the first structure 251s is 0°. A second azimuth θ2 of the second structure 252s is 90°. A third azimuth θ3 of the third structure 26s is 45°. Therefore, the angle of the first azimuth direction with respect to the third azimuth direction is −45°. The angle of the second azimuth direction with respect to the third azimuth direction is 45°. Further, the azimuth direction is equal to the deposition direction in plan view. Therefore, the angle of the deposition direction of the first cover film 251 with respect to the deposition direction of the alignment film 26 is −45°, and an angle of a deposition direction of the second cover film 252 with respect to the deposition direction of the alignment film 26 is 45°. Further, the deposition direction of the first cover film 251 is along the signal line 242, and the deposition direction of the second cover film 252 is along the scanning line 241. Further, in other words, the deposition direction of each of the first cover film 251 and the second cover film 252 is a row direction or column direction of the plurality of pixel electrodes 24.

As described above, each pixel electrode 24 has a rectangular shape in plan view, and the plurality of pixel electrodes 24 are disposed in a matrix form in the X1 direction and the Y1 direction. In such disposition of the plurality of pixel electrodes 24, the first azimuth θ1 is 0° and the second azimuth θ2 is 90°, and thus it is possible to curb overlapping of areas in which the first cover film 251 and the second cover film 252 are not provided to each other, in plan view. Therefore, in the non-pixel area A12, it is possible to provide the part of the second cover film 252 in the area in which the first cover film 251 is not provided. Therefore, it is possible to fill the non-pixel area A12 with the two cover films including the first cover film 251 and the second cover film 252. Therefore, even when the cover layer 25 does not include three or more cover films, it is possible to efficiently fill the non-pixel area A12. Therefore, it is possible to curb a decrease in light transmissivity due to an increase in the number of layered layers of the cover layer 25. Therefore, it is possible to effectively curb deterioration in display quality.

The first azimuth θ1 of the first structure 251s may be 90°, and the second azimuth θ2 of the second structure 252s may be 0°. Further, the azimuth of 0° includes, for example, a manufacturing error within a range that does not impair the above-described effects, and also includes an azimuth of −2° or more and 2° or less. Similarly, the azimuth of 90° includes, for example, a manufacturing error within a range that does not impair the above-described effects, and also includes an azimuth of 88° or more and 92° or less.

Further, as described above, the third azimuth θ3 of the third structure 26s is 45°. The alignment film 26 controls the alignment of the liquid crystal molecules 50. As described above, the electro-optical device 1 is of the VA type, and the liquid crystal molecules 50 are substantially vertical at an azimuth of 45° in a state in which no voltage is applied. Therefore, in the VA type, the azimuth of the pretilt angle θ of the liquid crystal molecules 50 is 45°. The azimuth of the pretilt angle θ is the azimuth of the liquid crystal molecules 50 with respect to the reference line Ax in plan view.

In a VA type in which the third azimuth θ3 of the third structure 26s is 45°, when the first azimuth θ1 is 0° and the second azimuth θ2 is 90°, as illustrated in FIGS. 5 and 6, it is possible to provide the alignment film 26 on the portion in which the first cover film 251 and the second cover film 252 are layered. Therefore, it is possible to maximize the planarity of the upper surface 260s of the alignment film 26. The same effects can be obtained when the first azimuth θ1 of the first structure 251s is 90° and the first azimuth θ1 of the second structure 252s is 0°.

Figure 10:
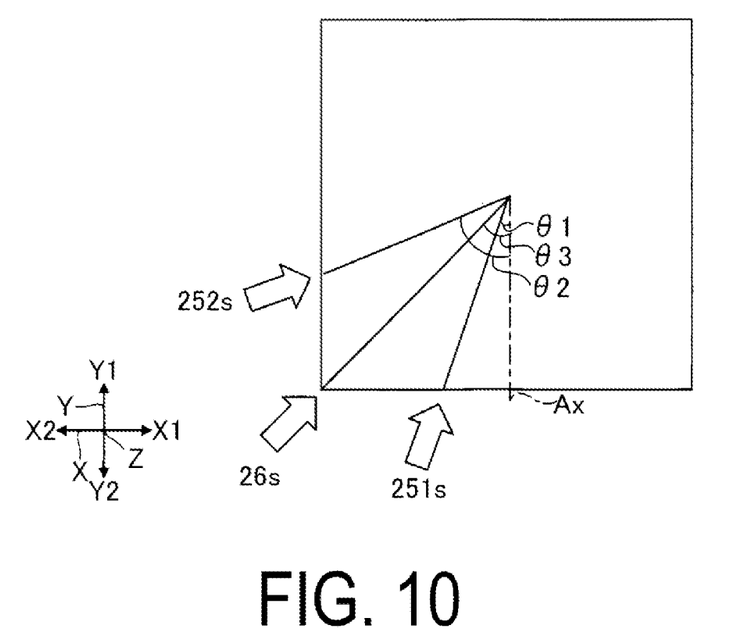
FIG. 10 is a diagram illustrating other azimuths of the first structure, the second structure, and the third structure.

FIG. 10 is a diagram illustrating other azimuths of the first structure 251s, the second structure 252s, and the third structure 26s. In the example illustrated in FIG. 10, the first azimuth θ1 of the first structure 251s is 22.5°. The second azimuth θ2 of the second structure 252s is 67.5°. The third azimuth θ3 of the third structure 26s is 45°. Therefore, the angle of the first azimuth direction with respect to the third azimuth direction is −22.5°. The angle of the second azimuth direction with respect to the third azimuth direction is 22.5°.

Figure 11:
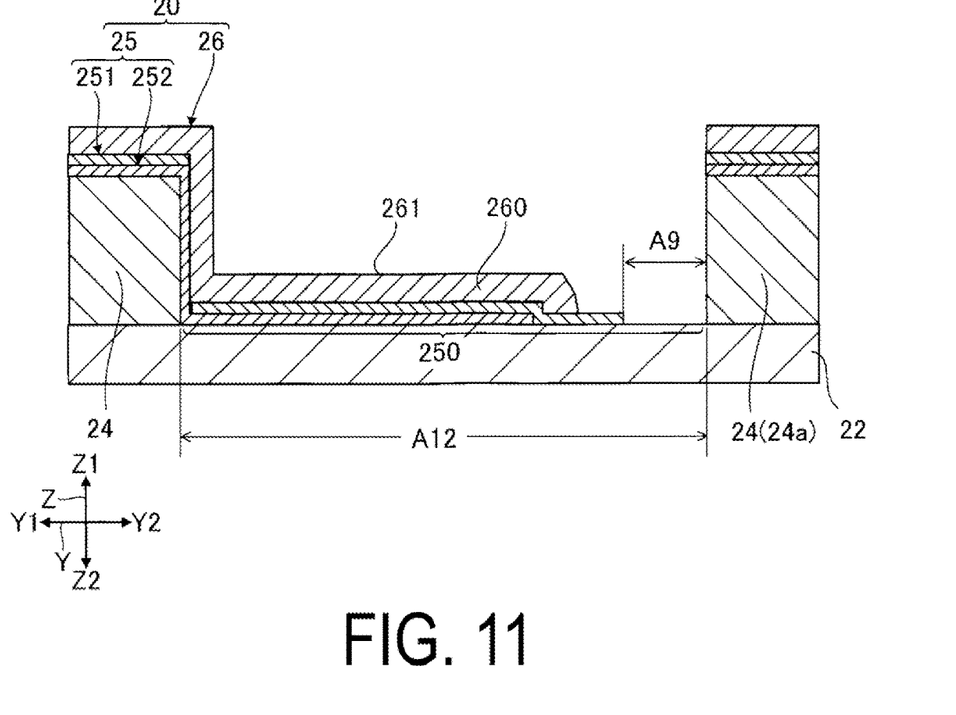
FIG. 11 is a cross-sectional view of the first alignment layer corresponding to FIG. 10.

FIG. 11 is a cross-sectional view of the first alignment layer 20 corresponding to FIG. 10. FIG. 11 corresponds to a cross section taken along line a-a in FIG. 4. In the example illustrated in FIG. 11, the first cover film 251 includes the first structure 251s of which the first azimuth θ1 is 22.5°. The second cover film 252 includes the second structure 252s having the second azimuth θ2 of 67.5°. The alignment film 26 includes the third structure 26s of which the third azimuth θ3 is 45°. In the example illustrated in FIG. 11, an area A9 in which the first alignment layer 20 is not formed is generated in the non-pixel area A12. Therefore, the inorganic insulating layer 22 having no alignment regulation force may come into contact with the liquid crystal molecules 50, causing poor alignment.

Figure 12:
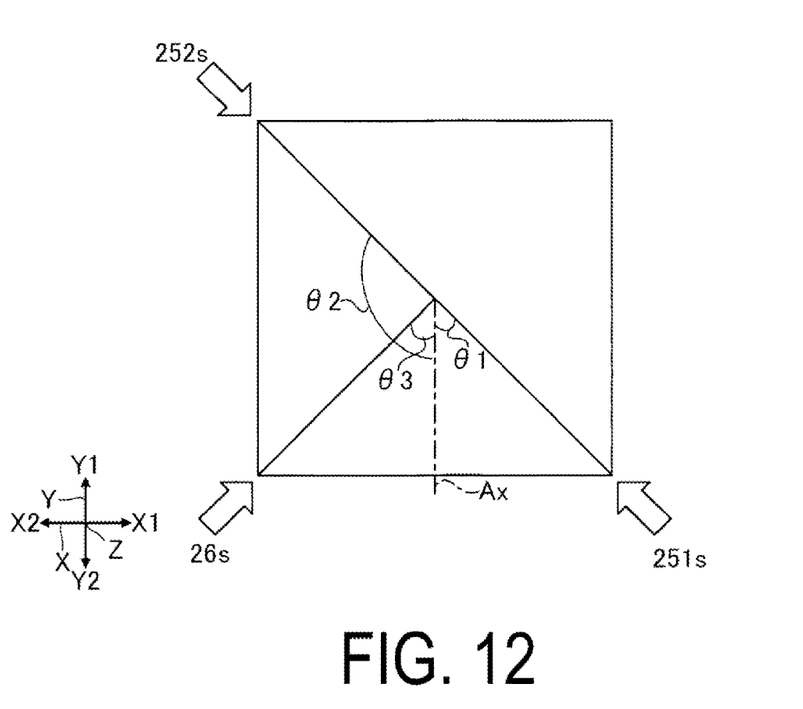
FIG. 12 is a diagram illustrating other azimuths of the first structure, the second structure, and the third structure.

FIG. 12 is a diagram illustrating other azimuths of the first structure 251s, the second structure 252s, and the third structure 26s. In the example illustrated in FIG. 12, the first azimuth θ1 of the first structure 251s is −45°, that is, 315°. The second azimuth θ2 of the second structure 252s is 135°. The third azimuth θ3 of the third structure 26s is 45°. Therefore, the angle of the first azimuth direction with respect to the third azimuth direction is −90°. The angle of the second azimuth direction with respect to the third azimuth direction is 90°.

Figure 13:
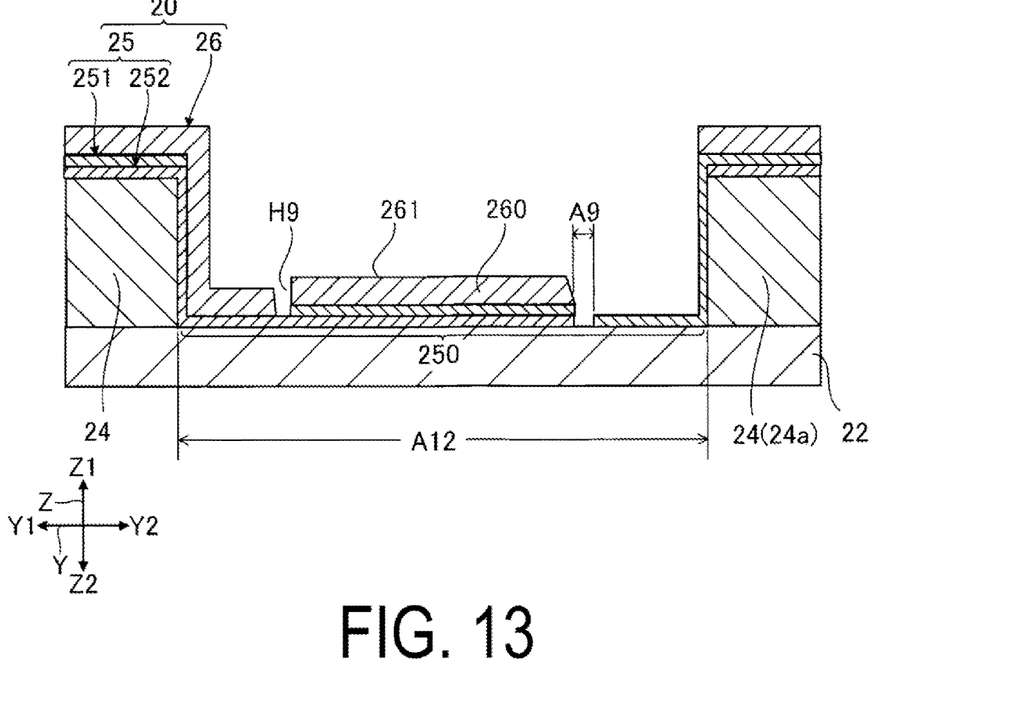
FIG. 13 is a cross-sectional view of the first alignment layer corresponding to FIG. 12.

FIG. 13 is a cross-sectional view of the first alignment layer 20 corresponding to FIG. 12. FIG. 13 corresponds to a cross section taken along line a-a in FIG. 4. In the example illustrated in FIG. 13, the first cover film 251 includes the first structure 251s of which the first azimuth θ1 is −45°. The second cover film 252 includes the second structure 252s having the second azimuth θ2 of 135°. The alignment film 26 includes the third structure 26s of which the third azimuth θ3 is 45°. In the example illustrated in FIG. 13, an area A9 in which the first alignment layer 20 is not formed is generated in the non-pixel area A12. Therefore, there the inorganic insulating layer 22 having no alignment regulation force may come into contact with the liquid crystal molecules 50, causing poor alignment. Further, in the example illustrated in FIG. 13, a groove H9 extending through the alignment film 26 is formed. Therefore, the planarity of the upper surface 260s of the alignment film 26 is impaired. The presence of the groove H9 may cause poor alignment.

Figure 14:
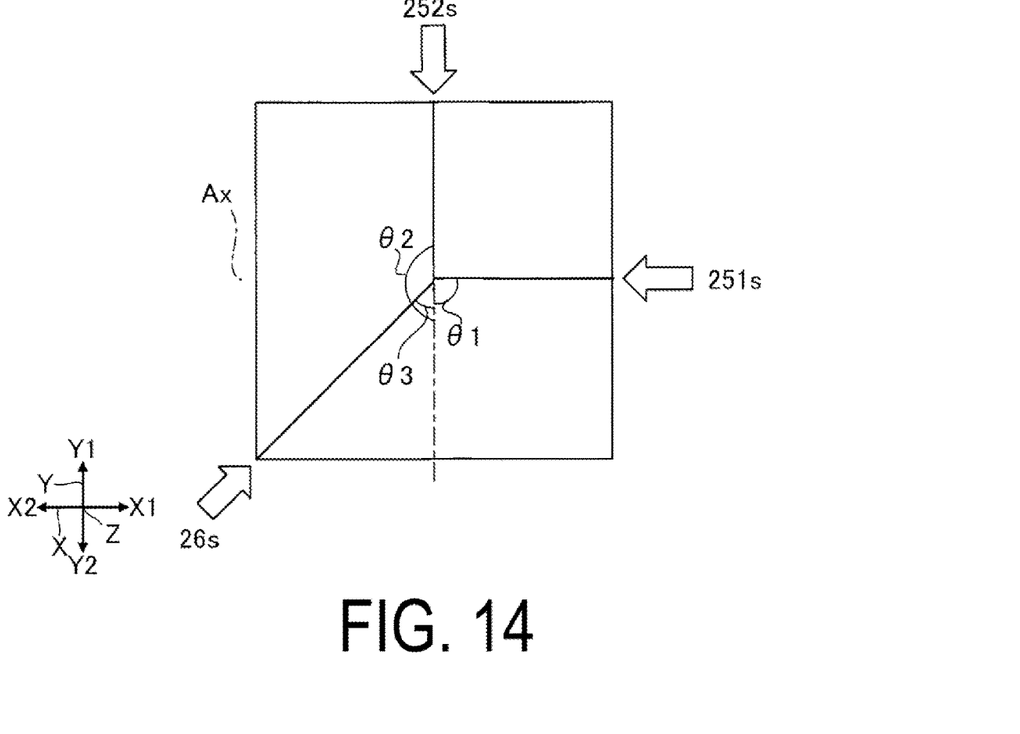
FIG. 14 is a diagram illustrating other azimuths of the first structure, the second structure, and the third structure.

FIG. 14 is a diagram illustrating other azimuths of the first structure 251s, the second structure 252s, and the third structure 26s. In the example illustrated in FIG. 14, the first azimuth θ1 of the first structure 251s is −90, that is, 270°. The second azimuth θ2 of the second structure 252s is 180°. The third azimuth θ3 of the third structure 26s is 45°. Therefore, the angle of the first azimuth direction with respect to the third azimuth direction is −135°. The angle of the second azimuth direction with respect to the third azimuth direction is 135°.

Figure 15:
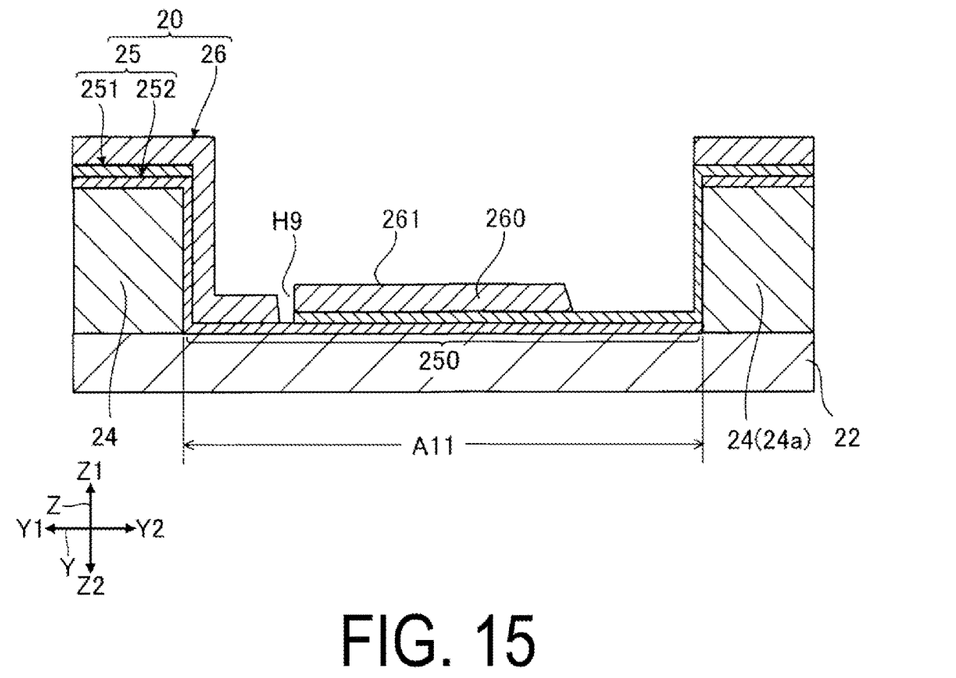
FIG. 15 is a cross-sectional view of the first alignment layer corresponding to FIG. 14.

FIG. 15 is a cross-sectional view of the first alignment layer 20 corresponding to FIG. 13. FIG. 15 corresponds to the cross section taken along line a-a in FIG. 4. In the example illustrated in FIG. 15, the first cover film 251 includes the first structure 251s of which the first azimuth θ1 is −90°. The second cover film 252 includes the second structure 252s having the second azimuth θ2 of 180°. The alignment film 26 includes the third structure 26s of which the third azimuth θ3 is 45°. In the example illustrated in FIG. 15, the groove H9 extending through the alignment film 26 is formed. Therefore, the planarity of the upper surface 260s of the alignment film 26 is impaired. The presence of the groove H9 may cause poor alignment.

Further, in the example illustrated in FIG. 14, a deposition direction when the first cover film 251 is formed through oblique deposition is the X2 direction, and the deposition direction when the second cover film 252 is formed through the oblique deposition is the Y2 direction. Therefore, the deposition direction when the first cover film 251 and the second cover film 252 are formed through the oblique deposition is the row direction or column direction of the plurality of pixel electrodes 24. In the example illustrated in FIG. 14, the non-pixel area A12 can be filled with the cover layer 25, but it is difficult to ensure the planarity of the upper surface 260s of the alignment film 26.

In order to fill the non-pixel area A12 and for the upper surface 260s to include a planar surface, one of the first azimuth θ1 or the second azimuth θ2 may be 90°, the other thereof may be 0°, and the third azimuth θ3 may be 45°. However, the angle differs depending on the shape and disposition of the plurality of pixel electrodes 24. Therefore, the first azimuth θ1, the second azimuth θ2, and the third azimuth θ3 are set so that the non-pixel area A12 is filled and the upper surface 260s includes a planar surface. Further, when the cover layer 25 includes a third cover film, the first azimuth θ1, the second azimuth θ2, the azimuth of the third cover film, and the third azimuth θ3 are set so that the non-pixel area A12 is filled and the upper surface 260s includes a planar surface.

2. Modification Examples

The embodiments illustrated above may be modified in various ways. Modifications that can be applied to the above-described embodiments are illustrated below. Two or more aspects freely selected from the following examples may be combined as appropriate to the extent that the aspects do not contradict each other.

In each of the embodiments described above, the electro-optical device 100 of an active matrix type is illustrated, but the present disclosure is not limited to thereto, and the drive type of the electro-optical device 100 may be, for example, a passive matrix type.

In the embodiment described above, the first cover film 251, the second cover film 252, and the alignment film 26 included in the first alignment layer 20 were formed through oblique deposition. However, as long as the non-pixel area A12 is filled with the cover layer 25 and the upper surface 260s of the alignment film 26 is planar, the first alignment layer 20 may be formed by using a method other than the oblique deposition. For example, the first cover film 251 or the second cover film 252 may be a film subjected to optical alignment processing.

3. Electronic Apparatus

The electro-optical device 100 can be used in various types of electronic apparatuses.

Figure 16:
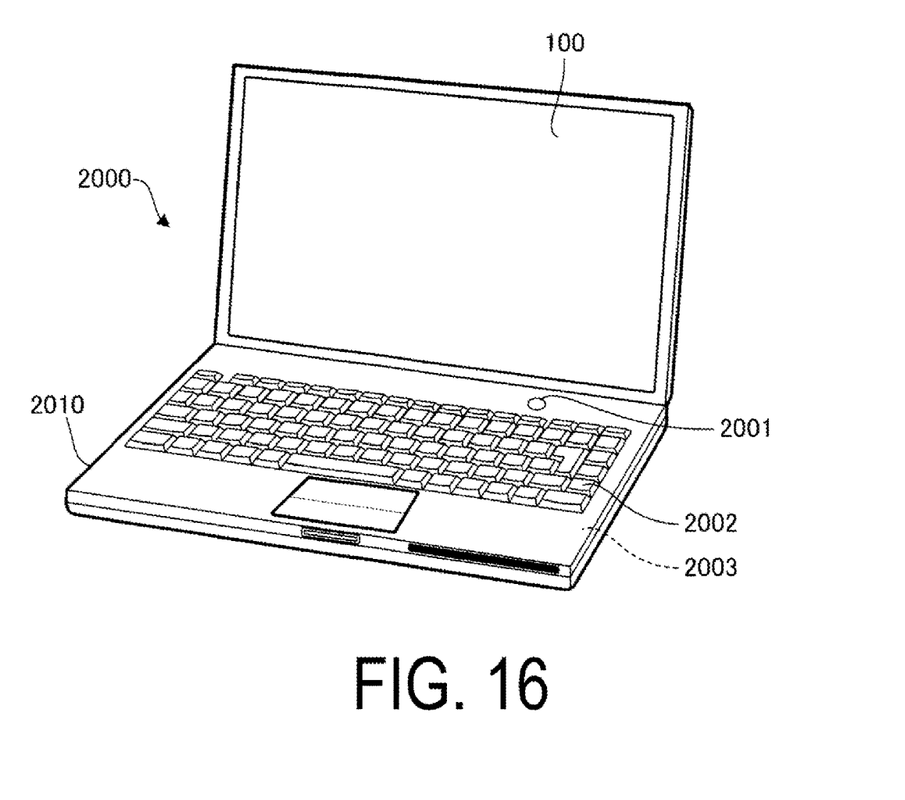
FIG. 16 is a perspective view of a personal computer that is an example of an electronic apparatus.

FIG. 16 is a perspective view illustrating a personal computer 2000, which is an example of the electronic apparatus. The personal computer 2000 includes the electro-optical device 100 that displays various images, a main body unit 2010 in which a power switch 2001 and a keyboard 2002 are installed, and a control unit 2003. The control unit 2003 includes, for example, a processor and a memory, and controls the operation of the electro-optical device 100.

Figure 17:
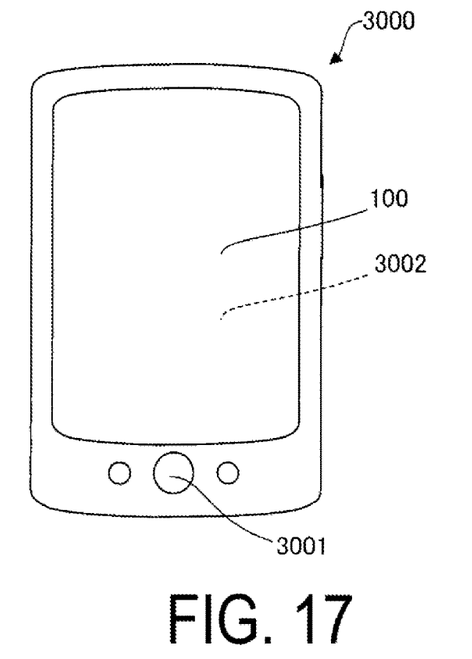
FIG. 17 is a plan view illustrating a smartphone which is an example of the electronic apparatus.

FIG. 17 is a plan view illustrating a smartphone 3000, which is an example of the electronic apparatus. The smartphone 3000 includes an operation button 3001, an electro-optical device 100 that displays various images, and a control unit 3002. Screen content displayed on the electro-optical device 100 is changed according to an operation of the operation button 3001. The control unit 3002 includes, for example, a processor and a memory, and controls an operation of the electro-optical device 100.

Figure 18:
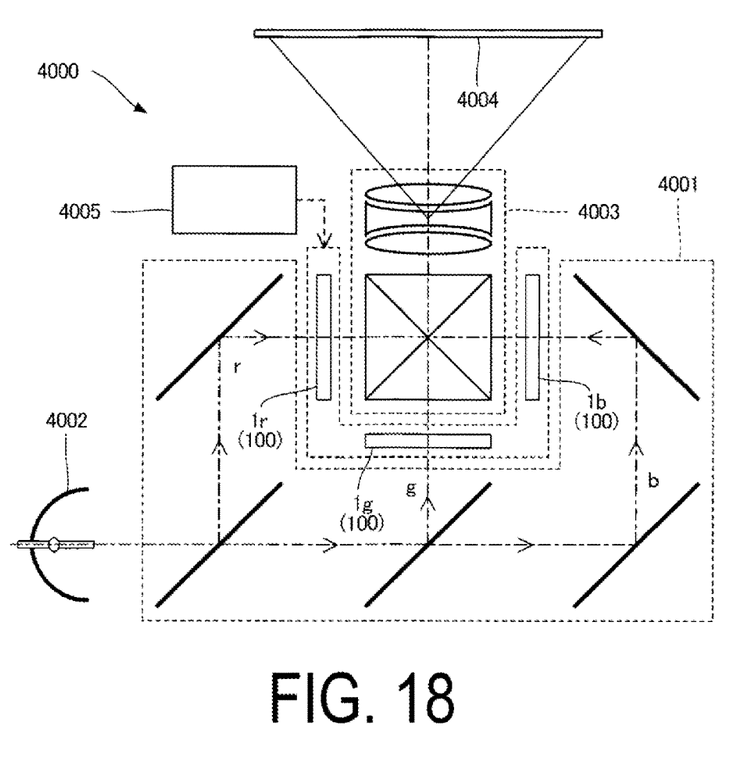
FIG. 18 is a schematic diagram illustrating a projector which is an example of the electronic apparatus.

FIG. 18 is a schematic diagram illustrating a projector that is an example of the electronic apparatus. A projection display device 4000 is, for example, a three-panel projector. An electro-optical device 1r is an electro-optical device 100 corresponding to a red display color, an electro-optical device 1g is an electro-optical device 100 corresponding to a green display color, and an electro-optical device 1b is an electro-optical device 100 corresponding to a blue display color. That is, the projection display device 4000 includes three electro-optical devices 1r, 1g, and 1b corresponding to red, green, and blue display colors, respectively. A control unit 4005 includes, for example, a processor and a memory, and controls the operation of the electro-optical device 100.

An illumination optical system 4001 supplies a red component r of light emitted from an illumination device 4002, which is a light source, to the electro-optical device 1r, supplies a green component g to the electro-optical device 1g, and supplies a blue component b to the electro-optical device 1b. Each of the electro-optical devices 1r, 1g, and 1b serves as an optical modulator such as a light valve that modulates each monochromatic light supplied from the illumination optical system 4001 in accordance with a displayed image. A projection optical system 4003 combines light emitted from the respective electro-optical devices 1r, 1g, and 1b and projects the combined light onto a projection surface 4004.

The above electronic apparatus includes the electro-optical device 100 described above and the control unit 2003, 3002, or 4005. In the electro-optical device 100 described above, deterioration in display quality is curbed. Therefore, when the electro-optical device 100 is provided, it is possible to improve the display quality of the personal computer 2000, the smartphone 3000, or the projection display device 4000.

Electronic apparatuses to which the electro-optical device of the present disclosure is applied are not limited to the illustrated apparatuses, and examples of the electronic apparatus include Personal Digital Assistants (PDAs), digital still cameras, televisions, video cameras, car navigation devices, in-vehicle displays, electronic notebooks, electronic paper, calculators, word processors, workstations, videophones, and Point of Sale (POS) terminals. Further, examples of the electronic apparatus to which the present disclosure is applied may include printers, scanners, copiers, video players, and apparatuses including a touch panel.

Although the present disclosure has been described above based on the preferred embodiments, the present disclosure is not limited to the above-described embodiments. Further, the configuration of each component of the present disclosure can be replaced by any configuration that exhibits the same function as that of the above-described embodiment, and any configuration can be added. Further, in the above description, the liquid crystal display device has been described as an example of the electro-optical device of the present disclosure, but the electro-optical device of the present disclosure is not limited thereto. For example, the electro-optical device of the present disclosure can be applied to an image sensor, or the like.

What is claimed is:

1. An electro-optical device, comprising:
   a first substrate;
   a second substrate facing the first substrate; and
   an electro-optical layer disposed between the first substrate and the second substrate and having an optical characteristic changeable in accordance with an electrical field, wherein
   the first substrate includes a substrate, an inorganic insulating layer, a first pixel electrode and a second pixel electrode spaced apart from each other, and an alignment layer,
   the inorganic insulating layer, the first pixel electrode, the second pixel electrode, and the alignment layer are arranged in order from the substrate toward the electro-optical layer, the alignment layer includes a cover layer and an alignment film provided between the cover layer and the electro-optical layer, the cover layer includes a first portion filling an area of the inorganic insulating layer between the first pixel electrode and the second pixel electrode in a plan view, the alignment film includes a second portion that is in contact with the first portion and of which a surface opposite to the first portion is a planar surface, and a thickness of the alignment film is larger than a thickness of the cover layer.

2. An electronic apparatus, comprising:
the electro-optical device according to claim 1; and
a control unit configured to control an operation of the electro-optical device.

3. An electro-optical device, comprising:
a first substrate;
a second substrate facing the first substrate; and
an electro-optical layer disposed between the first substrate and the second substrate and having an optical characteristic changeable in accordance with an electrical field, wherein the first substrate includes a substrate, an inorganic insulating layer, a first pixel electrode and a second pixel electrode spaced apart from each other, and an alignment layer, the inorganic insulating layer, the first pixel electrode, the second pixel electrode, and the alignment layer are arranged in order from the substrate toward the electro-optical layer, the alignment layer includes a cover layer and an alignment film provided between the cover layer and the electro-optical layer, the cover layer includes a first portion filling an area of the inorganic insulating layer between the first pixel electrode and the second pixel electrode in a plan view, the alignment film includes a second portion that is in contact with the first portion and of which a surface opposite to the first portion is a planar surface, the cover layer further includes a first cover film being in contact with the inorganic insulating layer and including an inorganic material, and a second cover film disposed between the first cover film and the alignment film and including an inorganic material, the first cover film includes a first structure inclined with respect to a normal line to a substrate surface of the first substrate, the second cover film includes a second structure inclined with respect to the normal line, and an azimuth of the first structure and an azimuth of the second structure are different from each other.

4. The electro-optical device according to claim 3, further comprising
a plurality of pixel electrodes including the first pixel electrode and the second pixel electrode and disposed in a matrix form along a first direction and a second direction orthogonal to each other, wherein one of the first structure and the second structure has an azimuth of 0°, and the other of the first structure and the second structure has an azimuth of 90°.

5. The electro-optical device according to claim 4, wherein the alignment film includes an inorganic material, and includes a third structure tilted with respect to the normal line, and the third structure has an azimuth of 45°.

6. An electronic apparatus, comprising:
the electro-optical device according to claim 3; and
a control unit configured to control an operation of the electro-optical device.

7. An electro-optical device, comprising:
a first substrate;
a second substrate facing the first substrate; and
an electro-optical layer disposed between the first substrate and the second substrate and having an optical characteristic changeable in accordance with an electrical field, wherein the first substrate includes a substrate, an inorganic insulating layer, a plurality of pixel electrodes disposed in a matrix form along a first direction and a second direction intersecting with each other, and an alignment layer, the inorganic insulating layer, the plurality of pixel electrodes, and the alignment layer are arranged in order from the substrate toward the electro-optical layer, the alignment layer includes a first cover film, a second cover film, and an alignment film in order, the first cover film includes a first structure inclined with respect to a normal line to a substrate surface of the first substrate, the second cover film includes a second structure inclined with respect to the normal line, the alignment film includes a third structure inclined with respect to the normal line, one of the first structure and the second structure has an azimuth of 0°, the other of the first structure and the second structure has an azimuth of 90°, and the third structure has an azimuth of 45°.

8. The electro-optical device according to claim 7, wherein each of the first structure, the second structure, and the third structure has a columnar shape.

9. The electro-optical device according to claim 7, wherein the first cover film and the second cover film eliminate a negative influence of the inorganic insulating layer on growth of the third structure.

* * * * *